(12) United States Patent
Jeong

(10) Patent No.: US 8,145,852 B2
(45) Date of Patent: Mar. 27, 2012

(54) DEVICE HAVING SHARED MEMORY AND METHOD FOR PROVIDING ACCESS STATUS INFORMATION BY SHARED MEMORY

(75) Inventor: Jong-Sik Jeong, Seoul (KR)

(73) Assignee: Mtekvision Co., Ltd., Seoul (KR)

( * ) Notice: Subject to any disclaimer, the term of this patent is extended or adjusted under 35 U.S.C. 154(b) by 451 days.

(21) Appl. No.: 12/296,079

(22) PCT Filed: Apr. 6, 2007

(86) PCT No.: PCT/KR2007/001694
§ 371 (c)(1),
(2), (4) Date: Oct. 3, 2008

(87) PCT Pub. No.: WO2007/114676
PCT Pub. Date: Oct. 11, 2007

(65) Prior Publication Data
US 2009/0043970 A1    Feb. 12, 2009

(30) Foreign Application Priority Data

Apr. 6, 2006  (KR) .................. 10-2006-0031320

(51) Int. Cl.
*G06F 15/167* (2006.01)

(52) U.S. Cl. ................. 711/150; 711/E12.013

(58) Field of Classification Search .............. 711/150, 711/E12.013
See application file for complete search history.

(56) References Cited

U.S. PATENT DOCUMENTS

| 4,414,624 | A | * | 11/1983 | Summer et al. ................. 712/21 |
| 6,381,686 | B1 | * | 4/2002 | Imamura ....................... 711/203 |
| 6,510,496 | B1 | * | 1/2003 | Tarui et al. .................... 711/147 |
| 6,718,443 | B2 | * | 4/2004 | Yoshida ........................ 711/147 |
| 6,965,974 | B1 | * | 11/2005 | Bays et al. .................... 711/153 |
| 2003/0088744 | A1 | | 5/2003 | Jain et al. |
| 2003/0221071 | A1 | * | 11/2003 | McKenney et al. ........... 711/152 |
| 2005/0021914 | A1 | * | 1/2005 | Chung ........................... 711/145 |
| 2005/0041510 | A1 | | 2/2005 | Khawand et al. |
| 2005/0050282 | A1 | * | 3/2005 | Vantalon et al. .............. 711/147 |
| 2005/0144369 | A1 | * | 6/2005 | Jaspers ......................... 711/105 |
| 2005/0193081 | A1 | * | 9/2005 | Gruber et al. ................. 709/212 |
| 2006/0179252 | A1 | * | 8/2006 | Cantin et al. .................. 711/144 |
| 2007/0083716 | A1 | * | 4/2007 | Rajamony et al. ............ 711/141 |

FOREIGN PATENT DOCUMENTS

| KR | 10-2002-0063365 A | 8/2002 |
| KR | 10-2004-0093167 A | 11/2004 |
| KR | 10-2005-0011152 A | 1/2005 |

* cited by examiner

*Primary Examiner* — Hal Schnee
(74) *Attorney, Agent, or Firm* — Birch, Stewart, Kolasch & Birch, LLP

(57) ABSTRACT

A device having a shared memory and a method for providing access status information by the shared memory are disclosed. A digital processing device includes n processors and a shared memory. The shared memory is coupled to each processor though a separate bus, its storage area includes m common sections, and generates and outputs access status information related to whether an arbitrary processor is accessing at least one of the common sections. With the present invention, a control sequence of each processor can be simplified at a maximum by allowing the shared memory to generate and output access status information related to the common sections.

29 Claims, 8 Drawing Sheets

Figure 7

| Physical identity | BANK #1 | BANK #2 | BANK #3 | BANK #4 |
|---|---|---|---|---|
| Functional identity | Dedicated section A | Common section A | Common section B | Dedicated section B |
| MP recognition | BANK #1 | BANK #2 | BANK #3 | - |
| AP recognition | - | BANK #3 | BANK #2 | BANK #1 |

DEVICE HAVING SHARED MEMORY AND METHOD FOR PROVIDING ACCESS STATUS INFORMATION BY SHARED MEMORY

CROSS-REFERENCE TO RELATED APPLICATIONS

This application claims foreign priority benefits under 35 U.S.C. sctn. 119(a)-(d) to PCT/KR2007/001694, filed Apr. 6, 2007, which is hereby incorporated by reference in its entirety.

BACKGROUND

1. Technical Field

The present invention is directed to a digital processing device, more specifically to a digital processing device including a shared memory shared by a plurality of processors.

2. Description of the Related Art

In a digital processing device, a portable terminal refers to a compact electronic device that is designed to be easily carried by a user in order to perform functions such as game or mobile communication. The portable terminal can be a mobile communication terminal, a personal digital assistant (PDA), a portable multimedia player (PMP) or an MP3 player.

The mobile communication terminal is essentially a device designed to enable a mobile user to telecommunicate with a receiver who is remotely located. Thanks to scientific development, however, the latest mobile communication terminals have functions, such as camera and multimedia data playback, in addition to the basic functions, such as voice communication, short message service and address book.

FIG. 1 is a block diagram illustrating a conventional mobile communication terminal having a camera function.

Referring to FIG. 1, the mobile communication terminal 100 having a camera function includes a high frequency processing unit 110, an analog-to-digital converter 115, a digital-to-analog converter 120, a processing unit 125, a power supply 130, a key input 135, a main memory 140, a display 145, a camera 150, an video processing unit 155 and a support memory 160.

The high frequency processing unit 110 processes a high frequency signal, which is transmitted or received through an antenna.

The analog-to-digital converter 115 converts an analog signal, outputted from the high frequency processing unit 110, to a digital signal and sends it to the processing unit 125.

The digital-to-analog converter 120 converts a digital signal, outputted from the processing unit 125, to an analog signal and sends it to the high frequency processing unit 110.

The processing unit 125 controls the general operation of the mobile communication terminal 100. The processing unit 125 can include a central processing unit (CPU) or a microcontroller.

The power supply 130 supplies electric power required for operating the mobile communication terminal 100. The power supply 130 can be coupled to, for example, an external power source or a battery.

The key input 135 generates key data for, for example, setting various functions or dialing of the mobile communication terminal 100 and sends the key data to the processing unit 125. For example, the key input unit 135 can be realized as a key pad including a plurality of key buttons.

The main memory 140 stores an operating system and a variety of data of the mobile communication terminal 100. The main memory 140 can be, for example, a flash memory or an EEPROM (Electrically Erasable Programmable Read Only Memory).

The display 145 displays the operation status of the mobile communication terminal 100 and an external video photographed by the camera 150.

The camera 150 photographs an external video (a photographic subject) and generates and outputs a video signal corresponding to the photographed external video.

The video processing unit 155 processes the external video photographed by the camera 150. The video processing unit 155 can perform functions such as color interpolation, gamma correction, video quality correction and JPEG encoding. The camera 150 and the video processing unit 155 can be controlled by the processing unit 125.

The support memory 160 stores the external video processed by the video processing unit 155.

As described above, the mobile communication terminal 100 having a camera function is equipped with a plurality of processors (i.e. a main processor and at least one application processor for performing a predetermined additional function, controlled by the main processor). For example, the processing unit 125 for controlling general functions of the mobile communication terminal 100 and the video processing unit 155 for controlling the camera function are included in the mobile communication terminal 100, as illustrated in FIG. 1. Here, the video processing unit 155 is controlled by the processing unit 125. The processing unit 125 and the video processing unit 155 are embodied as a separate processor, respectively, and each processing unit is structured to be coupled with an independent memory.

The type of the application processor, which can be realized as a separate processor, respectively, and controlled by the main processor, can be varied depending on the additional function equipped in the portable terminal. For example, the application processor for controlling the camera function can process functions such as JPEG encoding and JPEG decoding; the application processor for controlling the movie file playback function can process functions such as video file (e.g., MPEG4, DIVX, H.264) encoding and decoding; and the application processor for controlling the music file playback function can process functions such as audio file encoding and decoding. Of course, there can be an application processor that can process various aforementioned functions altogether.

Each of these processing units has an individual memory for storing the data processed by the processing unit. Thus, according to the related art, it is necessary to increase the number of processing units and memories as portable terminals become increasingly multifunctional, which, as a result, causes to increase the external size of the portable terminal.

FIG. 2 is an example illustrating a coupling structure among a main processor, an application processor and their corresponding memories in accordance with the related art.

Referring to FIG. 2, a main processor 210 and an application processor 220 communicate information (e.g., a command for controlling the application processor and data to be processed by the application processor 220) through a coupled bus. A bus typically refers to a common-purpose electric pathway that is used to transmit information between the processor, the main memory and the input/output in a device such as a computer. The bus includes a line for data, designating the address of each device or the location of the memory, and a line for distinguishing a variety of data transmission operation to be processed. The bus, which couples the main processor 210 to the application processor 220, is called an MP (main processor)-AP (application processor) bus.

The main processor 210 is coupled to the main memory 230 through a bus, which called an MP (main processor)-MM (main memory) bus, and the application processor 220 is coupled to the supplementary memory 240 through another bus, which is called an AP (application processor)-AM (application memory) bus.

Also, the application processor 220, which is coupled to the display device 250, allows information, corresponding to a command of the main processor 210, information, transferred from the main processor 210, or data, processed by the application processor 220, to be displayed through the display device 250.

As illustrated in FIG. 2, the processors 210 and 220 is independently coupled to the memories 230 and 240, respectively. Accordingly, depending on the operation that should be currently running, the main processor 210, for example, reads data stored in the main memory 230 and transmits the data to the application processor 220 through the host interface or reads data stored in the supplementary memory 240 by requesting the application processor 220.

In other words, in case a certain process operation is to be processed in the main processor 210 and the application processor 220, respectively, in order to process certain data, the main processor 210 first accesses the main memory 230 to read data and performs a necessary operation processing of the read data. Then, the main processor 210 transmits the processed data to the application processor 220. The application processor 220 re-processes the received data and stores the data in the supplementary memory 240. Then, the application processor 220 transmits the data, stored in the supplementary memory 240, back to the main processor 210 so as to be stored in the main memory 230.

In this case, the larger the amount of data is communicated between the main processor 210 and the application processor 220, the more time each of the processors 210 and 220 has to spend on the operation (i.e. memory accessing, data reading, host interface operating) requested by the other processor rather than the operation of its own process.

For example, in the case of processing 3-D graphic data having large transmission amount and being displayed through the display device 250, the main processor 210 reads and processes the data, stored in the main memory 230, and transmits the processed data to the application processor 220 through the MP-AP bus. The application processor 220 stores the data (e.g., polygon data and texture data), received through the MP-AP bus in the application memory 240, and then, reads and processes the stored data so as to be displayed through the display 250.

In the case of processing the 3-D graphic data, there is naturally a large amount of data transmitted between the main processor 210 and the application processor 220, to thereby lead to loss of the unnecessary time and the processing efficiency of each processor 210 and 220 in the operation transmitted and received with large data.

Beside that, a bottleneck is caused in data communication between the main processor 210 and the application processor 220 as the amount of data to be processed and the functions performed by the portable terminal increase.

As a result, the problems described above weaken the overall performance of a multi-function portable terminal.

SUMMARY

The present invention provides a device having a shared memory and a method for providing access status information by the shared memory that can increase the using efficiency of the shared memory by dividing the storage area of the shared memory into a plurality of sections (e.g., a dedicated section and a common section).

The present invention provides a device having a shared memory and a method for providing access status information by the shared memory that can minimize transmission time of data between each processor by allowing each processor to be able to access a common section of the partitioned storage section.

The present invention provides a device having a shared memory and a method for providing access status information by the shared memory that can optimize the operation speed and efficiency of each processor because each processor is able to skip an additional process for transferring data by using a common section of the shared memory.

The present invention provides a device having a shared memory and a method for providing access status information by the shared memory that can have the effect, as if data is directly transferred, by transferring an only access authority because a plurality of processors can cross-access a common section in the storage area of a shared memory.

The present invention provides a device having a shared memory and a method for providing access status information by the shared memory that can simplify the control sequence of each processor at a maximum by generating and outputting the access status information (i.e. occupying status information) related to n partitioned common sections, n being a natural number, of the shared memory.

The present invention provides a device having a shared memory and a method for providing access status information by the shared memory that can allow each processor to quickly process data through each partitioned common section by generating and outputting the access status information (i.e. occupying status information) related to the n partitioned common sections, n being a natural number, of the shared memory.

The present invention provides a device having a shared memory and a method for providing access status information by the shared memory that can maximize a data transferring speed by allowing a main processor to successively written data in n partitioned common sections, n being a natural number, and the application processor to successively access and read the data written in the partitioned common sections by the main processor.

Other problems that the present invention solves will become more apparent through the following description.

To solve the above problems, an aspect of the present invention features a digital processing device having a plurality of processors sharing one memory and/or a memory device shared by a plurality of processors.

According to an embodiment of the present invention, a digital processing device can include n processors, n being a natural number and the same as or larger than 2; and a shared memory, coupled to the n processors through separate buses, respectively, its storage area including m common sections, m being a natural number, and generating and outputting access status information related to whether an arbitrary processor accesses at least one of the common sections. Here the common section can refer to a storage area that is can be individually accessed by k processors during a non-coinciding period of time, k being a natural number and $2 \leq k \leq n$.

The storage area can further include c dedicated sections, respectively, that is, allotted so as to be permitted to be accessed by a predetermined processor, c being a natural number.

The common section of a plurality of banks can be configured such that each of the processors recognizes that the common section is allotted with a number having a relatively greater value, the plurality of banks consisting of the common sections and the dedicated sections.

The shared memory can output the access status information to the processor that attempts to access an arbitrary common section.

The processor can input an access request, including at least one of address information and a control signal, into the shared memory to access the common section.

The control signal can include an address signal, directing to the common section, and a chip select signal of the common memory device. Here, the address signal can include a bank address directing to an arbitrary common section.

Alternatively, the control signal can include a mode register set (MRS) signal and a chip select signal of the common memory device.

The shared memory can generate and output the access status information by referring to a value written in a predetermined section by a processor, in order that the processor accesses the common section The access status information can be access status information related to one common section that is attempted to access or related to all common sections.

If it is recognized that it is impossible to access the common section by the access status information, the processor attempting to the common section can transmit a request for receiving access authority to the shared memory, and if it is recognized that it is possible to access the common section according to the request for receiving the access authority, the shared memory can output new access status information to the processor.

The shared memory can include at least one access status information pin independently corresponding to each processor, and the access status information can be outputted through the access status information pin.

Some of data pins for writing data in a storage area of the shared memory or for reading data written in a storage area of the shared memory can be temporary allotted as the access status information pin.

The access status information can include at least one of reading status information and writing status information.

The n processors can include a main processor and n−1 application processors, coupled to the main processor through separate control buses, respectively, and performing a process according to a control signal inputted through the control bus The application processors can process data, written, by the main processor, in the common section.

The shared memory can include the storage area; n access ports corresponding to the processors, respectively; and an internal controller, generating access status information related to whether an arbitrary processor accesses the common section and outputs the information to at least one of the processors.

Section partitioning information corresponding to the capacity or the number of the dedicated section and the common section can be set by any one processor and transferred to n−1 processors.

According to another embodiment of the present invention, a memory device, which is shared by n processors, n being a natural number and the same as or larger than 2, can include n access ports, coupled corresponding to the n processors, respectively; a storage area, including m common sections partitioned, m being a natural number, in order that k processors can individually access during a non-coinciding period of time, k being a natural number and $2 \leq k \leq n$; and an internal controller, generating and outputting access status information related to whether the processors access an arbitrary common section.

The storage area further can include c dedicated sections, respectively, that is, allotted so as to be permitted to be accessed by a predetermined processor, c being a natural number.

The internal controller can output the access status information to the processor, which has attempted to access an arbitrary common section.

The processor can input an access request, including at least one of address information and a control signal, for attempting to access the common section into the shared memory.

The shared memory can generate and output the access status information by referring to a value written in a predetermined section by a processor, in order that the processor accesses the common section.

The access status information can be access status information related to one common section that is attempted to access or related to all common sections.

After a request for receiving access authority to an arbitrary common section can be inputted from an arbitrary processor, if it is recognized that it is possible to access the common section, the internal controller can output access status information indicating that it is possible to access the common section to the processor.

The shared memory can include at least one access status information pin independently corresponding to each processor, and the access status information is outputted through the access status information pin.

Some of data pins for writing data in a storage area of the shared memory or for reading data written in a storage area of the shared memory can be temporary allotted as the access status information pin.

The access status information can include at least one of reading status information and writing status information.

Section partitioning information corresponding to the capacity or the number of the dedicated section and the common section can be set by any one processor and transferred to n−1 processors.

To solve the above problems, another aspect of the present invention features a method, for providing access status information, performed by a memory device and/or a recorded medium having recorded a program for executing the method.

According to an embodiment of the present invention, a method that a shared memory, shared by a plurality of processors, provides access state information can include determining whether a second processor has already been accessing an arbitrary common section if an access request to the common section is inputted from a first processor; and generating access status information corresponding to the determined result and outputting the access status information to the first processor. Here, the common section can refer to a storage area partitioned in order that a plurality of processors can individually access the common section during a non-coinciding period of time.

The shared memory can include at least one access status information pin independently corresponding to each processor, and the access status information is outputted through the access status information pin.

Some of data pins for writing data in a storage area of the shared memory or for reading data written in a storage area of the shared memory can be temporary allotted as the access status information pin.

The access status information can include at least one of reading status information and writing status information of the second processor for the common section.

The method can further include receiving a request for receiving access authority from the first processor sensing that the common section is accessed by the second processor, by the access status information; and outputting new access status information to the first processor if it is determined that the common section is accessible by ending the access of the second processor.

The access request and the request for receiving the access authority, respectively, can include at least one of address information and a control signal, to attempt to access the common section.

The access request and the request for receiving the access authority can be performed by writing a value in a predetermined area, in order that the first processor can access the common section.

According to another embodiment of the present invention, a recorded medium having recorded a program including a typicalized command for providing access status information by a shared memory, the command being executable by a memory device, and the recorded medium being readable by the memory device, including determining whether a second processor has already been accessing an arbitrary common section if an access request to the common section is inputted from a first processor; and generating access status information corresponding to the determined result and outputting the access status information to the first processor, whereas the memory device is shared by a plurality of processors, the common section is a storage area partitioned in order that a plurality of processors can individually access the common section during a non-coinciding period of time, and the first processor, which is coupled to the second processor through a control bus and performs a processing according to the control signal received from the first processor, reads and processes data written in the common section by the second processor according to the received control signal

BRIEF DESCRIPTION OF THE DRAWINGS

FIG. 7 is an example illustrating the usage allotment of each partitioned area in accordance with some embodiment of the present invention.

DETAILED DESCRIPTION

Figure 1:
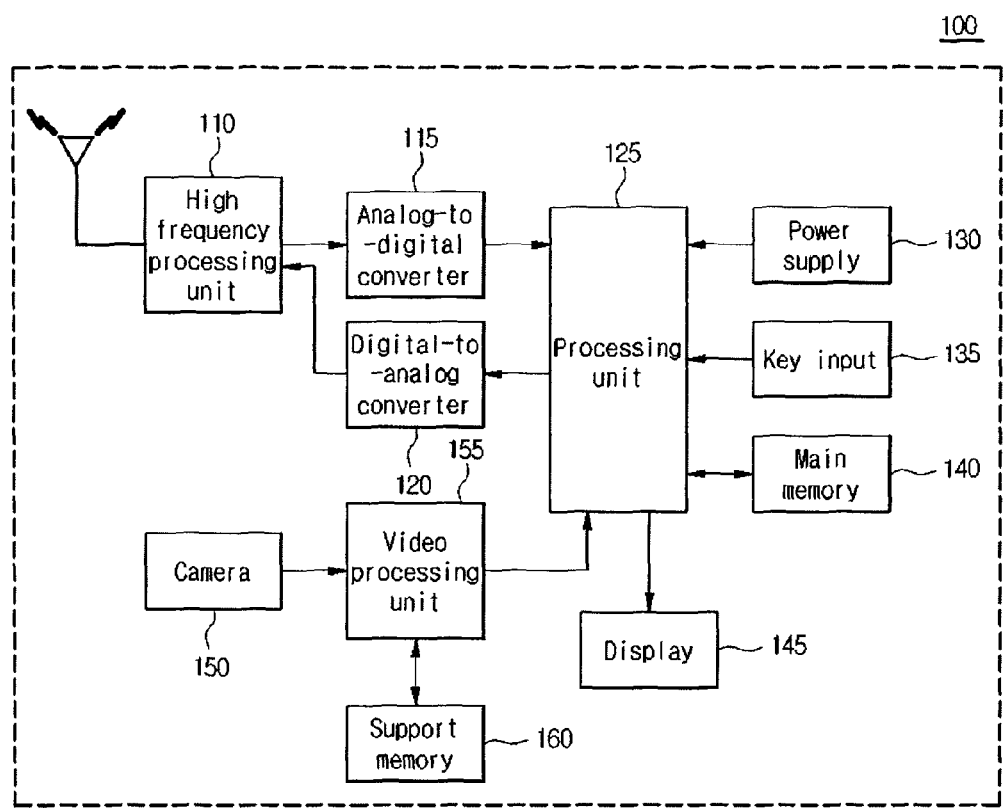
FIG. 1 is a block diagram illustrating a conventional mobile communication terminal having a camera function.
Figure 2:
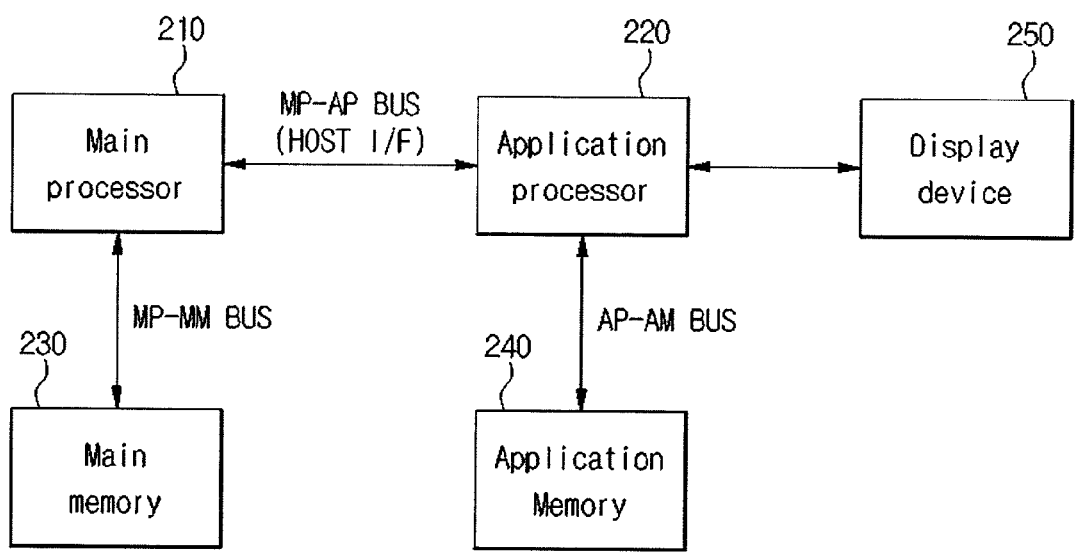
FIG. 2 is an example illustrating a coupling structure among a main processor, an application processor, and their corresponding memories in accordance with the related art.

The above objects, features and advantages will become more apparent through the below description with reference to the accompanying drawings.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as bow they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, preferred embodiments will be described in detail with reference to the accompanying drawings. Identical or corresponding elements will be given the same reference numerals, regardless of the figure number, and any redundant description of the identical or corresponding elements will not be repeated.

A shared memory in this description provides information, related to whether any one processor is currently accessing a common section, to at least one processor, in order to control a plurality of processors not to attempt to access the common section. The common section can be used, for example, to transfer data between the plurality of processors (e.g. the data to be processed by an application processor is stored by a main processor, and then, the application processor accesses a corresponding stored area and reads the stored data). Alternatively, the common section can used as an additional storage area in the case of using out all storage sections of the dedicated area.

Figure 3:
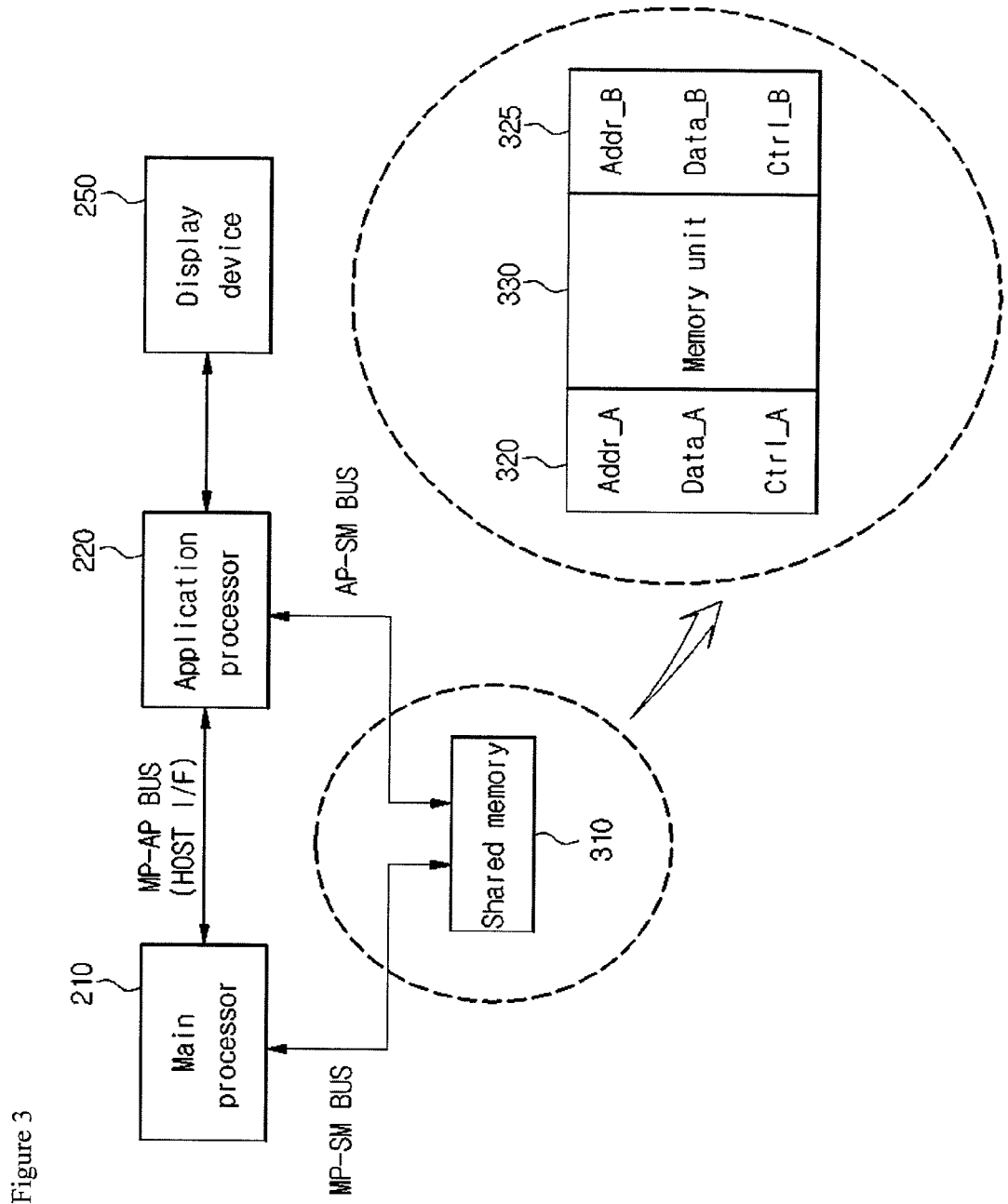
FIG. 3 is a block diagram illustrating a coupling structure between a main processor, an application processor, a memory unit and a display device, in accordance with an embodiment of the present invention.
Figure 4:
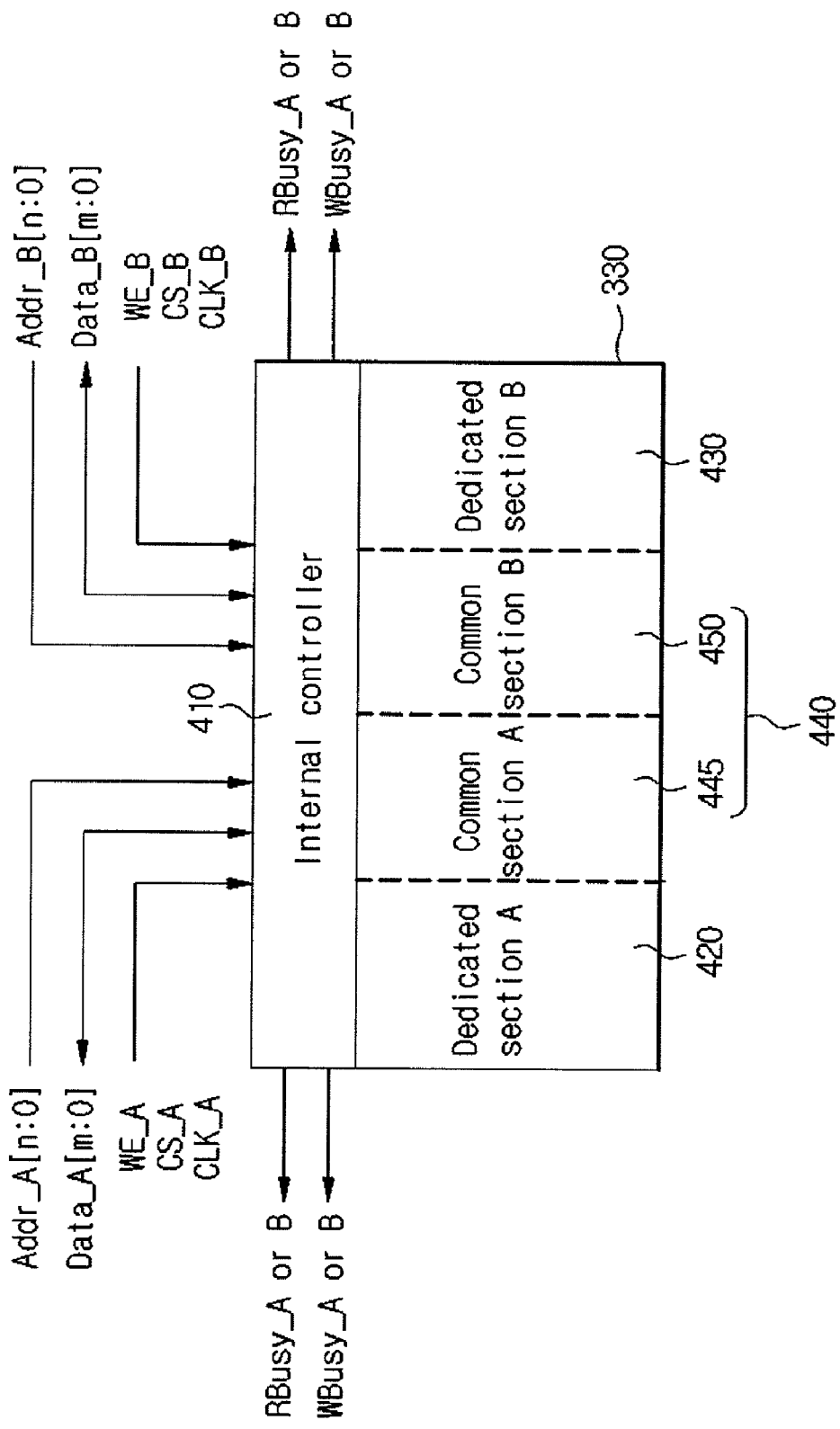
FIG. 4 through FIG. 6 illustrate the structure of a memory unit in accordance with an embodiment of the present invention.
Figure 5:
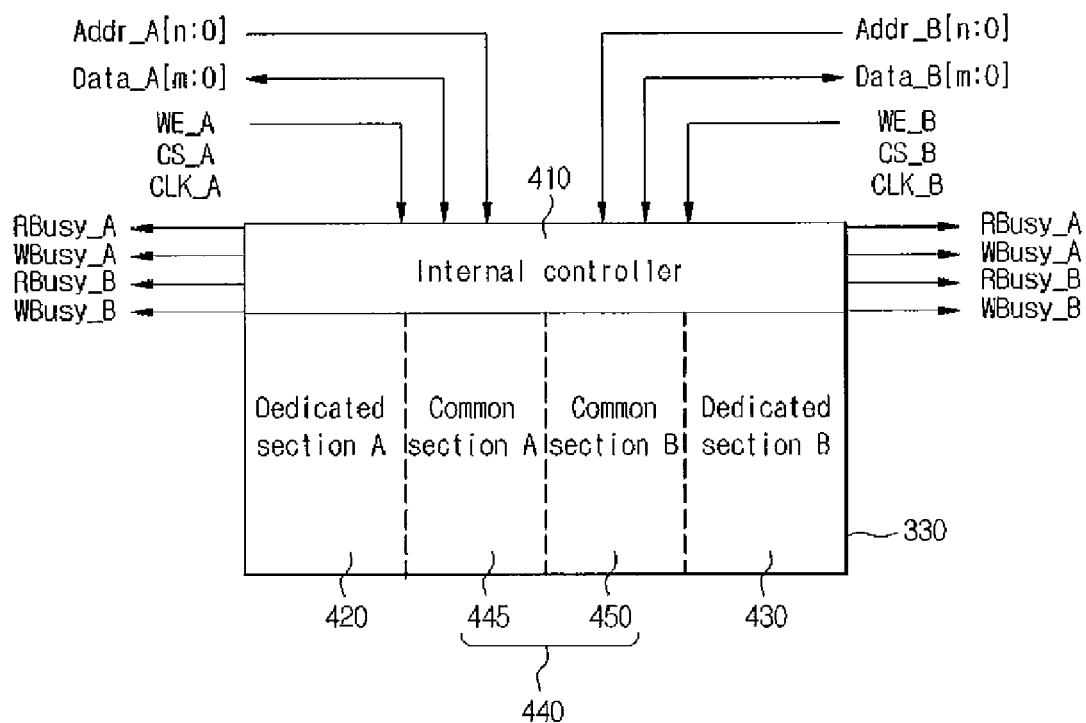
Figure 6:
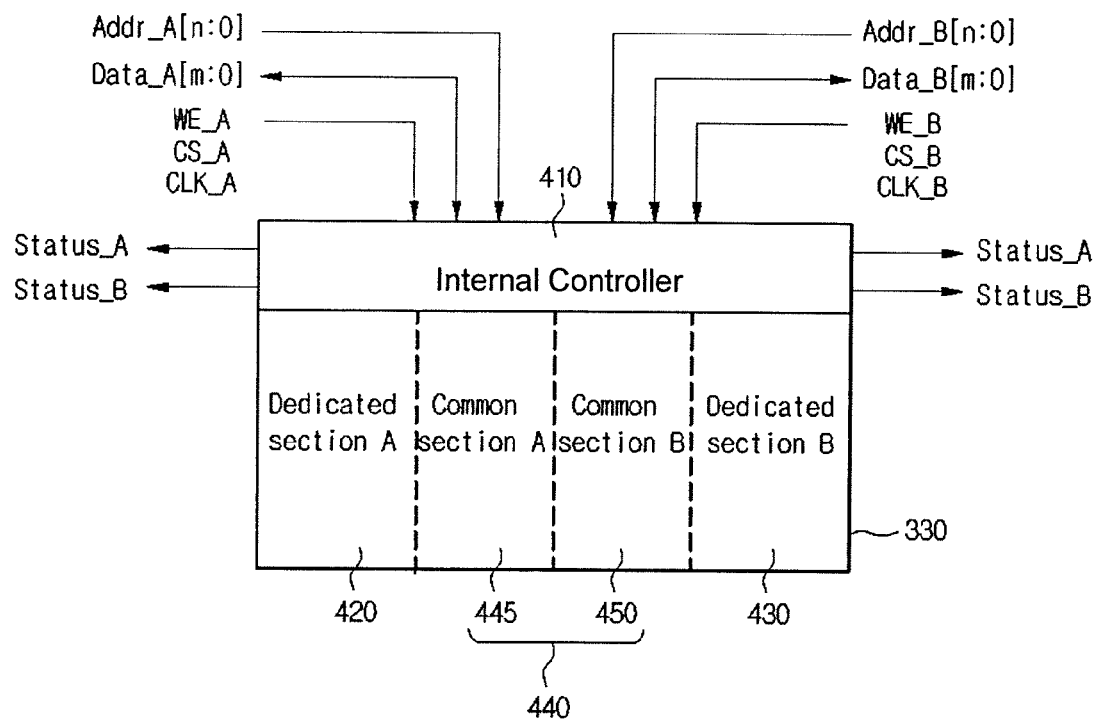

FIG. 3 is a block diagram illustrating a coupling structure between a main processor, an application processor, a memory unit and a display device, in accordance with an embodiment of the present invention, FIG. 4 through FIG. 6 illustrate the structure of a memory unit in accordance with an embodiment of the present invention, and FIG. 7 is an example illustrating the usage allotment of each partitioned area in accordance with some embodiment of the present invention As illustrated in FIG. 3, a main processor 210 and an application processor 220 of a digital processing device in accordance with the present invention are coupled to each other by a structure sharing one shared memory 310. A shared memory, which can be applied to the present invention, is acceptable without any restriction if the type of the shared memory can be shared by the plurality of processors to be driven. For example, the shared memory can be a SDRAM or a flash memory.

Behind the application processor 220 is coupled the display device, which is directly controlled by the main processor 210 or is controlled by the application processor 220 according to a processing command of the main processor 210. The main processor 210 can output a control command, for controlling the display device 250 or the application device 220, through the MP-AP. Although FIG. 3 illustrates that behind the application processor 22 is coupled to the display device 250 only as an output device, the coupled output device can be varied depending on the function of the application processor 220.

Even though FIG. 3 illustrates the only application processor 220, it shall be obvious that the number or processing operation is varied depending on functions equipped by the digital processing device. Also, FIG. 3 illustrates that one shared memory 310 is shared by the plurality of processors. However, not only the number of the shared memory 310 can be increased or decreased as necessary, but also the processors sharing each shared memory can be different from each other. For example, a first shared memory can be shared by the main processor and a first application processor, a second shared memory can be shared by the main processor and a second application processor or a third shared memory can be the first application processor and the second application processor.

Referring to FIG. 3, the main processor 210 and the application processor 220 can transmit or receive information (e.g. a driving start command/driving end command of the display device 250, or a processing command, for directing to process data written in the shared memory 310, and status information) through the MP-AP.

The main processor 210, which is coupled to the shared memory 310 through an MP-SM (shared memory), writes data (e.g. polygon data or texture data) in a specific storage area of the shared memory 310 or reads the data written in the pertinent storage area. Here, the main processor 210 can be a processor controlling a general operation of the digital processing device (e.g. a portable terminal).

The application processor 220, which is coupled to the shared memory 310 through an AP-SM, writes data in a specific storage area of the shared memory 310 or reads the data written in the pertinent storage area.

The application processor 220 can be a processor dedicated for processing MPEG-4, 3-D graphic, camera and MP3 file playback. In this case, if the application processor 220 receives a processing command (e.g. a command for processing data written by an arbitrary address and directing to a processing type) from the main processor 210 through the MP-AP, the application processor 220 accesses the shared memory 310 through the AP-SM and reads the data (i.e. the data written by the main processor 210) written in the a pertinent storage area of the shared memory 310. Here, since the main processor 210 is to store the pertinent data in a common section 440 (refer to FIG. 4), the main processor 210 must access a pertinent area prior to the application processor 220 in order that the application processor 220 can access the area. Of course, in case that the data to be processed by the application processor 220 is stored in the an area (e.g. the dedicated area B of FIG. 4) dedicated for the application processor 220, the main processor 210 can transmit an only corresponding processing command through the MP-AP, and the application processor 220 can process the data corresponding to the processing command. Also, the application processor 220 can be controlled by the main processor 210 for starting or ending its operation only. For the processing operation after starting, the application processor 220 can be controlled by a predetermined process or by a user command through the key input unit 135.

The memory unit 310, which is structured to be shared by a plurality of coupled processors (i.e. the main processor and at least one application processor), must have access ports corresponding to the number of mounted processors or the number of processors sharing the memory unit 330.

If it is assumed that the shared memory 310 is shared by one main processor 210 and one application processor 220, the shared memory 310, as illustrated in FIG. 3, is mounted with two accesses ports 320 and 325. In other words, the main processor 210 can access the memory unit 330 through the MP-SM bus and one access port 320, and the application processor 220 can access the memory unit through the AP-SM bus and another access port. Hereinafter, the access port 320 corresponding to the main processor 210 will be refers to as a first access port, and the access port 325 corresponding to the application processor 220 will be referred to as a second access port. Each access port can be mounted with n pins, for transmitting and receiving an address signal between corresponding processors, n being a natural number, m pins, for transmitting and receiving a data signal, m being a natural number, and k pins, for transmitting and receiving a control signal, k being a natural number. Also, h pins for transmitting and receiving access status information of a common section can be further mounted, h being a natural number. Of course, as described below, the pins for transmitting and receiving access status information of the common section can be shared with the pins for transmitting and receiving a data signal. This is because there is less possibility that a processor, which has been already a partitioned area of the memory unit 330 and is writing data therein, attempts to access another partitioned area or the memory unit 330.

As illustrated in FIG. 4 through FIG. 6, the memory unit 330 is equipped with one internal controller 410 and includes a storage area that can be partitioned into a plurality of sections for being allotted. The internal controller 410 is coupled to the main processor 210 and the application processor 220 through the first access port 320 and the second access port 325, respectively. An independent clock can be used for each processor 210 and 220.

As exampled in FIG. 4 through FIG. 6, the storage area of the memory unit 330 can be partitioned into a plurality of sections, that is, from 4 sections at a minimum to j sections at a maximum, j being a natural number. For example, the partitioned sections can include dedicated sections 420 and 430 and at least one common section 440. Here, each of the dedicated sections 420 and 430 refer to the section that can be exclusively accessed by a processor predetermined corresponding to the pertinent partitioned section (e.g. a dedicated section A 420 can be exclusively accessed by the main processor 210). The common section 440 refers to the section that can be individually accessed by all coupled processors at the non-identical time (e.g. a common section A 445 can be accessed by the application processor 220 at the time when the main processor 210 does not access the common section A 445). This aims to allow each processor to individually access the corresponding portioned sections (i.e. the dedicated sections and the common section) through its separate path to perform a necessary operation (e.g. data writing or data reading). First, the structure of the shared memory and the method for providing access status information by the shared memory wilt be briefly described with reference to FIG. 4.

If it is assumed that the shared memory 310 is controlled by two processors, the memory unit 330, as illustrated in FIG. 4, can be partitioned into 2 dedicated sections (i.e. a dedicated section A 420 and a dedicated section B) and the common sections 440. Of course, a plurality of dedicated sections can be allotted to each processor.

In case that the shared memory 310 is a SDRAM, for example, the purpose of the storage area can be set in units of each bank for the convenience. For example, 256 M bit SDRAM is set in units of 8 Mb×8 bits×4 banks. The pertinent banks, respectively, can be allotted to the dedicated section A 420, the dedicated section B 430, a common section A 445 and a common section B 450. Of course, each partitioned section can be allotted in units of not the bank but a predetermined partitioning standard (e.g. address range appointing).

As illustrated in FIG. 4, in case that the common section 440 is partitioned the common section A 445 and the common section B 450, if the main processor 210 transfers large capacity data to the application processor 220, some of the large capacity data can be firstly written in the common section A 445 as much as the storage section capacity of the common section A 445, and it can be followed that the other is written in the common section B 450. Accordingly, if the main processor 210 writing data completes to write the data in the common section A 445, the application processor 220 can access the common section A 445 to read the written data. Then, if the main processor 210 completes to access the common section B 450, the application processor 220 can access the common section B 450 and reads the remaining data.

Meanwhile, in case that the main processor 210 must transfer data to the application processor 220, and at the similar time, the application processor 220 must transfer data to the main processor 210, while the main processor 210 accesses the common section A 445 to written the data to be transferred, the application processor 210 can access the common section B 450 to write the data to be transferred. Also, one of each processor 210 and 220, which attempts to read and process data written in a storage section, can access the pertinent storage section after the other processor completes to access the storage section.

Below is described the method of providing access status information by the memory unit 330.

In order that the memory unit 330 provides access status information related to each partitioned section, it is not necessary that the access status information related to dedicated sections 420 and 430 is provided to each processor 210 and 220. This is because a processor, which is permitted to access each dedicated section, is predetermined and the corresponding processor has already known whether to access the pertinent dedication section for itself.

Accordingly, it is sufficient that the memory unit 330 provides only information related to the common sections A and B 445 and 450 to each processor or other processor (i.e. the processor that does not currently access the common sections). This is because each processor is restricted so as to be able to access the common section 440, only when the other processor does not access the common section 440.

However, as described above, in the case of being independently mounted with the pins (hereinafter, referred to as "access status information pins") for transmitting and receiving the access status information of the common section and of sharing the access status information pins with some of the in pins (hereinafter, referred to as "data signal pins") for transmitting and receiving a data signal, the access status information can be provided at the different time.

In other words, in the case of being separately mounted with the access status information pins, if any one processor (e.g. the main processor 210) accesses a specific common section (e.g. the common section A 445), the memory unit 330 can output the access status information (i.e. the signal indicating that the main processor 210 is currently accessing the common section A 445) through the access status information pins for allowing another processor (e.g. the application processor 220) to be unable to access the same common section directly after accessing or continually. The access status information can be outputted in a form of a high or low signal. The meaning of the pertinent signal can be predetermined according to its status. For example, the high signal can indicate that the pertinent common section is being accessed by a processor, and the low signal can indicate that the pertinent common section is accessible.

However, in the case of sharing some of the data signal pins as the access status information pins, the time when the memory unit 330 can output the access status information is restricted. This is because if any one processor (e.g. the main processor 210) has accessed a specific dedicated section (e.g. the dedicated section A 420) or a specific common section (e.g. the common section A 445) and is writing or reading data, the data signal pins has been being used for another purpose. Accordingly, in this case, the memory unit 330 can be allowed to output the access status information related to the pertinent common section to the main processor 210, only in case that the main processor transmits a request for accessing the pertinent common section in order to attempt to access a common section (e.g. the common section B 450).

The following table 1 shows the pin usage in the case of sharing some of the data signal pins as the access status information pins. Some pins of data signal pins can be predetermined as access status information pins. In the following table 1, a and b, which are predetermined natural numbers, respectively, can be identical to each other.

TABLE 1

| Corresponding processor | Data pin No. | When inputting control signal for accessing common section | When writing/reading data |
|---|---|---|---|
| Main processor | Data pin #a | Input and output data access status information related to common section A | Input and output data signal |
| Main processor | Data pin #a + 1 | Input and output data access status information related to common section B | Input and output data signal |
| Application processor | Data pin #b | Input and output data access status information related to common section A | Input and output data signal |
| Application processor | Data pin #b + 1 | Input and output data access status information related to common section B | Input and output data signal |
| | Data pin #b + 1 | Input and output data access status information related to common section B | Input and output data signal |

FIG. 4 through FIG. 6 assumes that the common section is partitioned into 2 partitioned sections 445 and 450. It shall be obvious that the number of data signal pins shared as access status information pins can be increased as the number of partitioned sections structuring the common section 440 is increased.

Hereinafter, the method of providing access status information by the memory unit 330 will be described with reference with FIG. 4 through FIG. 6.

For the convenience of description, it is assumed that the main processor 210 writes data in the common section A 445.

If the data, written in the common section A 445 by the main processor 210, is to be processed by the application processor 220, the main processor will transmit a processing command (e.g. a command for processing data written by an arbitrary address and directing to a processing type) to the application processor 220 through an MP-AP at a time (e.g. when starting to access the common section A 445, when starting to write data, or directly before or after ending to access the common section A 445) after completing to write the data. The application processor 220 accesses the shared memory 310 through an AP-SM according to the processing command and reads and processes the data (i.e. the data written by the main processor 210) written in the pertinent storage section.

Through the below description, it is easily understood that the main processor 210 attempts to access another common section or the application processor attempts to access an arbitrary common section.

First, the method of providing access status information by the memory unit 330 will be described with reference to FIG. 4.

In case that the main processor 210 accesses the common section A 445 of the memory unit 330 and writes data (e.g. any one of data to be processed by the application processor 220 and data to be displayed through the display device 250), the main processor 210 transmits a request, for accessing the common section A 445, to the internal controller 410 through the first access port 320 of the shared memory 310.

Here, the access request can be performed by writing a predetermined value at a predetermined register in a specific section of the storage area or the internal controller 410, by transmitting an address signal to the internal controller 410 or by transmitting an address signal and a control signal together. The address signal can be specific address information (Add_A), provided in the common section A 445, for data writing. Also, the control signal can be, for example, any one of a write enable (WE_A), for directing to data writing in the common section A, a chip select_A (SC_A), for chip selecting in the common section A, and a clock (CLK_A).

The internal controller 410 can recognizes that the main processor 210 attempts to access the common section A 445 through request information.

If the request information is the predetermined value written in the predetermined register, the internal controller 410 can recognize whether the main processor 210 attempts to access the common section A 445 by checking whether the pertinent value is stored in the corresponding register. The register can be predetermined for each processor. For example, if the register is predetermined for each processor, the corresponding processor can write '1' in the register to attempt the access and write '0' in the register after ending the access.

If the request information is the address signal, the internal controller 410 can recognize whether the main processor 210 attempts to access the common section A 445 by using the inputted address signal. Similarly, in case that the request information consists of the address signal and the control signal, the internal controller 410 can recognize whether the main processor 210 attempts to access the common section A 445 by the same way. However, if the request information further includes the control signal, the internal controller 410 can additionally recognize what operation the main processor 210 attempts to perform through the access to the common section A 445.

If the memory unit 330 recognizes that the main processor 210 attempts to access the common section A 445 by using the inputted address signal, the memory unit 330 checks whether the application processor 220 has already been accessing the common section A 445 and output corresponding access status information through the access status information pin.

This is because the internal controller 410 can recognize whether an arbitrary processor is accessing the common section A 445. In the case of recognizing that the application processor 220 is accessing the common section A 445, the internal controller 410 can recognize whether the application processor is accessing the common section A to write data or to read data trough the recognizing of the control signal, received from the application processor 220 earlier.

Accordingly, the internal controller 410 outputs the recognized access status information to the main processor 210 through the access status information pin.

In other words, as illustrated in FIG. 4, since in the case of allotting 2 access status information pins, more detailed access status information can be performed, the internal controller 410 outputs writing status information, that is, write busy (WBusy), related to the status that the application processor 220 is accessing the common section A 445 to write data, through one of the 2 access status information pins, and reading status information, that is, read busy (RBusy), related to the status that the application processor 220 is accessing the common section A 445 to read data, through the other access status information pin. If the main processor 210 has attempted to access the common section B, access status information related to the common section B 450 accessed by the application processor 220 will be transferred to the main memory 210.

In case that the access status information, inputted through the 2 access status information pins, is all low status, the main processor 210 can recognize the accessible status and access the common section A 445. However, in case that the access status information, inputted through any one of the 2 access status information pins, is high status, the main processor 210 can recognize that the application processor 220 is accessing the common section A 445 to write or read data and be on standby until the access to the application processor 220 is ended.

In other words, FIG. 4 illustrates the structure and operation of the shared memory 310 for providing information, related to whether the main processor 210 can access the common section A 445, and if the main processor 210 is unable to access the common section A 445, information, related to what operation the application processor 220 accesses the common section A 445 to perform, to the main processor 210 through minimum access status information pins.

However, the main processor 210, which attempts to the common section A 445, can need only information whether the application processor 220 accesses the common section A, but the information, related to what operation the application processor 220 accesses the common section A 445 to perform, can be unnecessary. This is because if the application processor 220 has already been accessing the common section A 445, the main processor 210 cannot but be on standby in order to access the common section A 445.

In this case, the number of the access status information pins can be minimized. This is because although only one access status pin is allotted, the main processor 210 can determine whether to be able to access the common section A 445 to be accessed by using the inputted access status information (status_A).

However, if accurate control is possible by including more access state information pins and providing a variety of information, the former embodiment can be preferable.

As compared with this, FIG. 5 and FIG. 6 illustrate the embodiment that if the main processor 210 attempts to access the common section A 445, the memory unit 330 provides all access status information related to all partitioned sections 445 and 450 of the common section 440 to the main processor 210.

In this case, although the main processor 210 currently attempts to access the common section A 445, the main processor 210 can recognize that the common section A 445 is being accessed by the application processor 220 and the common section B 450 is accessible. Accordingly, if the main processor 210 can access the common section B 450 and process the operation to be processed (e.g. write data for being provided to the application processor 220), the main processor 210 will be able to attempt the access to the common section B 450 and to quickly perform the data processing.

Beside that, even though 3 or more processors share the shared memory 310 and the common section 440 is partitioned into 2 partitioned sections 445 and 450, the main processor 210 can easily recognize whether all partitioned sections of the common section 440 has already been assessed or what operation another processor is accessing the pertinent processor to perform.

In other words, it is not necessary that the main processor 210 attempts to access all common sections per section to recognize the accessible common section.

Referring to FIG. 5, although the main processor 210 accesses the common section A 445, the memory unit 330 provides not only writing status information (WBusy_A) and reading status information (RBusy_A) of the common section A 445 but also writing status information (WBusy_B) and reading status information (RBusy_B) of the common section B 450.

Though this, the main processor 210 can recognize whether it is possible to access the currently attempted common section A 445, if the access is impossible, what operation another processor is accessing the common section A 445, and what partitioned section of the common section 440 can be currently accessed, at one time.

Similarly, even though the main processor 210 accesses the common section A 445, the memory unit 330, illustrated in FIG. 6, can provide not only the access status information (status_A) related to the common section A but also the access status information (status_B) related to the common section B.

As described above, the shared memory 310 of the present invention outputs corresponding access status information according to the access request, inputted from a processor coupled through a bus, to the process. As described earlier, the number of allotted access status information pins and outputted access status information can be varied depending on whether to provide detailed access status information and how many partitioned sections the common section is partitioned into.

Also, as illustrated in FIG. 4 through FIG. 6, in the case of partitioning the common section 440 into 2 or more partitioned sections such as the common section A 445 and the common section B 450, the common section 440 can be used as a path for transferring large capacity data between the main processor 210 and the application processor 220.

For example, in case that all storage capacity of the common section A 445 is used up while writing data in the common section A 445, the main processor 210 ends the access to the common section A 445 and attempts to access the common section B 450, to write the remaining data. In this operation, the main processor 210 can provide a pertinent processing command to the application processor 220. Of course, if the main processor 210 completes to write necessary data before using up all storage capacity of the common section A 445, the main processor 210 ends the access to the common section A 445.

The application processor 220 attempts to access the common section A 445 according to the processing command and determines whether to access the common section A 445 by using the access status information received from the shared memory 310. If the main processor 210 ends the access to the common section A 445, the application processor 220 accesses the common section A 445 and performs the data processing corresponding to the received processing command.

Beside that, the main processor 210, which has accessed the common section B 450, re-start to write the following data. If the data writing is completed or all storage capacity of the common section B 450 is used up, the main processor 210 ends the access to the common section B 450 to re-access the common section A 445. In this operation, the main processor 210 can re-provide the pertinent processing command to the application processor 220. Of course, if it is recognized that the application processor is unable to perform the processing according to the processing command with the only data for the common section A 445, the main processor 210 can attempt to access the common section B 450 in spite of providing no additional processing command.

As described above, when data having the larger capacity than each partitioned section is transferred between each processor, a receiver's processor can successively perform the access in order of the common section A 445, the common section B 450, the common section A 445 . . . and write data. Similarly, a transmitter's processor can successively perform the access in order of the common section A 445, the common section B 450, the common section A 445 . . . and read and process data. In this case, a specific common section will be accessed by the process writing the data, and then, the common section will be accessed by the process reading the data. Of course, it is impossible that one partitioned section is simultaneously accessed by a plurality of processors.

As described above, in case that one shared memory 310 is shared by the plurality of processors and the storage sections of the shared memory 310 are allotted to a plurality of partitioned sections in units of bank, for the convenience of controlling, the bank serial number of each partitioned section can be allowed to be differently recognized by each processor.

In other words, as illustrated in FIG. 7, the bank serial number of the shared memory 310 recognized by the main processor 210 can be allowed to be recognized identically to the bank serial number of the actual shared memory 310.

However, in the bank serial number of the shared memory 310 recognized by the application processor 220, since the common section 440 has a small bank serial number, if the zero address is used as a shared memory section, a program must be provided in the shared memory section all the time, to thereby cause a problem. Accordingly, in the case of viewing the shared memory section from the application processor 220, the bank serial number is preferably controlled to be viewed in reverse order.

This is because the bank of the zero address is typically used as a reset address. In other words, since the common section 440 has preceding bank serial numbers according to the bank serial number of the actual shared memory 310, the bank of the zero address must be used as the common section 440. However, since the common section 440 is a temporary data storing space, the common section 440 is insufficient to be used as the reset address. Accordingly, it is necessary that the application processor controls the bank serial number to be recognized in reverse order and the shared memory to be processed. Assuming that the main processor 210 accesses the plurality of partitioned sections in the forward direction, it can be considered that the application processor 220 accesses the corresponding partitioned sections in the reverse direction.

In another embodiment, a mode set register (MRS) signal according to the joint electron device engineering council (JEDEC) standard can be employed as a signal for memory access instead of the address signal. In other words, by using a specific bit of the MRS signal as means for requesting an access status of the shared memory, the MRS signal together with a chip selecting signal can be transferred to the internal controller 410. In this case, the MRS signal can be transferred to the internal controller 410 through a bus for receiving and transmitting the control signal or a separate pin.

Figure 8:
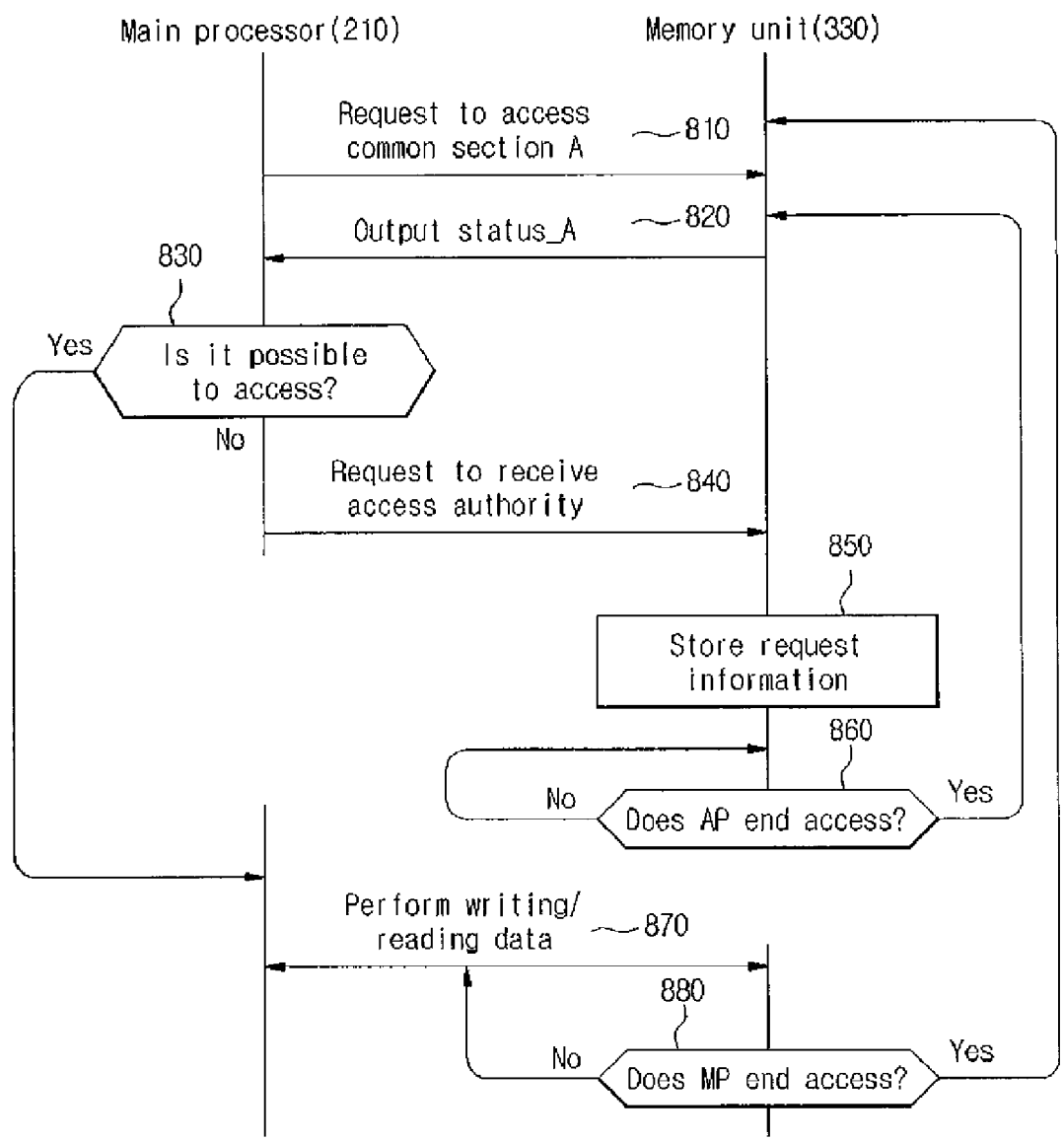
FIG. 8 is a flow chart illustrating the operation of an accessing common section in accordance with an embodiment of the present invention.

FIG. 8 is a flow chart illustrating the operation of an accessing common section in accordance with an embodiment of the present invention. For the convenience of description and understanding, the operation that the main processor 210 accesses the common section A 445 to write or read data will be assumed and described.

Referring to FIG. 8, in a step represented by 810, the main processor 210 transmits a request for accessing the common section A 445 to the memory unit 330.

Here, the access request can be performed by writing a predetermined value at a predetermined register in a specific section of the storage area or the internal controller 410, or by transmitting an address signal or an address signal and a control signal together to the internal controller 410.

In a step represented by 820, the memory unit 330 outputs access status information corresponding to the common section A 445 to the main processor 210. The memory unit 330 can output information (status_A) related to only whether to access it or information (WBusy_A and RBusy_A) related to what operation is to be performed after accessing it. Of course, as described above, access status information related to other common sections can be outputted together. This is because the internal controller 410 can recognize that the main processor 210 attempts to access the common section A 445 by an access request.

In a step represented by 830, the main processor 210 determines whether to be able to access the common section A 445 by referring to the received access status information. In case that all signals, inputted through an access status information pin, are low signals, the main processor 210 can determine that it is possible to access the common section A445. Of course, it can be predetermined that the information indicated by a high or low state of the pertinent signal is different.

If it is possible to access the common section A 445, the main processor 210, which advances to a step represented by 870, accesses the common section A 445 to write or read data.

However, if the application processor 445 has already been accessing the common section A 445, the main processor 210, which advances to a step represented by 840, transmits a request for receiving an access authority to the memory unit 330. The request for receiving the access authority can include an address signal or an address signal and a control signal.

In a step represented by 850, the memory unit 330 stores the request for receiving the access authority received from the main processor 210 in a predetermined storing space. This is to give the request for receiving the access authority to the main processor 210 in case that the application ends the access to the common section A 445.

If the access request, provided to the memory unit 330, is performed by writing a value in a predetermined register, the steps represented by 840 and 850 can be omitted. This is because in the state where the memory unit pre-recognizes that the main processor 210 will access the common section A 445 by using the register value written in the step represented by 810, it is sufficient that the access authority is given to the main processor 210 when the application processor 220 ends the access to the common section A 445.

Also, as described above, if the access status information, outputted through the step represented by 820, includes the access status information related to all partitioned sections in the common section 440, the main processor 210 can access the accessible partitioned sections of the common section 440 to perform, for example, data writing. In this case, the steps represented by 840 through 860 can be omitted. However, the main processor 210 can read the data written in the common section A 445 by carrying out the steps represented by 840 through 860

In the step represented by 860, the memory unit 330 determines whether the application processor 220 ends the access to the common section A 445.

In case that the application processor 220 maintains the access to the common section A 445, the memory unit 330 is on standby in the step represented by 860. However, in case that the application processor 220 ends the access to the common section A 445, the memory unit 330, which advances to the step represented by 820, outputs the access status information corresponding to the common section A 445.

The main processor 210 receives that it is possible to access the common section A 445 by using the access status information re-received from the memory unit 330 in the step represented by 830 and advances to a step represented by 870 to write or read data.

In a step represented by 880, the memory unit 330 determines whether the main processor 210 ends the access to the common section A 445

If the main processor 210 has still been accessing the common section A 445, the operation advances to the step represented by 870. Otherwise, the operation is ended and waits until the access request by any processor 210 or 220 is received. Of course, if the application processor 220 transmits the request for receiving the access authority in order to access the common section A 445, the memory unit 330 can re-transmit the access status information to the application processor 220.

The method that the memory unit 330 determines whether the main processor 210 ends the access to the common section A 445 can be varied. Below are described the two methods.

First, if the main processor 210 completes the necessary operation after accessing the common section A 445, a predetermined clear signal (i.e. a signal for requesting to delete the stored request information) can be transmitted. The memory unit 330 can recognizes that the main processor 210 ends the access to the common section A 445 by the clear signal.

Then, the memory unit 330 (i.e. the internal controller unit 410) can determine whether to write or read data is not continued at intervals of a predetermined time after the main processor 210 starts the accessing. If the data writing or reading is not continued at intervals of a predetermined time, the memory unit 330 can recognize that the main processor 210 ends the access to the common section A 445.

The present invention has been described based on the operation that the main processor 210 writes data (e.g. data to be processed by the application processor 220 or to be outputted through the display unit 250). However, the operation that the main processor 210 or the application processor 220 accesses the common section 440 of the memory unit 330 to write data or read the written data will be easily understood by those of ordinary skill in the art through the aforementioned description. Accordingly, the pertinent description will be omitted.

Also, although the present invention has been described based on the case of realizing each processor and memory as an independent chip, it shall be obvious that each processor and memory can be realized as at least one processor and at least one chip. In this case, at least one processor and one memory can be embodied in a form of separate modules.

As described above, a method for providing access status information by a shared memory can be also realized as a code that is readable by a computer in a recorded medium that is readable by the computer. The recoded medium, which is readable by the computer, includes all kinds of recoded media storing data readable by a computer system. The recoded medium readable by the computer includes, for example, not only ROM, RAM, CD-ROM, magnetic tape, floppy disc and optical data storing device but also means realized in a form of carrier wave (e.g. the transmission through Internet). Also, the recoded medium readable by the computer can be distributed to the computer system connected by a network, and store and execute the code readable by the computer by a distributing method. A functional program, code and code segment for embodying the method of providing access status information by the shared memory can be inferred by a programmer in the technical field to which the invention pertains.

As described above, the present invention can increase the using efficiency of a shared memory by partitioning the storage area of the shared memory into a plurality of sections (e.g., a dedicated section and a common section).

Also, the present invention can minimize transmission time of data between each processor by allowing each processor to be able to access a common section of the partitioned storage section.

The present invention can optimize the operation speed and efficiency of each processor because each processor is able to skip an additional process for transferring data by using a common section of the shared memory.

The present invention can have the effect, as if data is directly transferred, by transferring an only access authority because a plurality of processors can cross-access a common section in the storage area of a shared memory.

The present invention can simply the control sequence of each processor at a maximum by generating and outputting the access status information (i.e. occupying status information) related to n partitioned common sections, n being a natural number, of the shared memory.

The present invention can allow each processor to quickly process data through n partitioned common sections by generating and outputting the access status information (i.e. occupying status information) related to the n partitioned common sections, n being a natural number, of the shared memory.

In addition, the present invention can maximize a data transferring speed by allowing a main processor to successively written data in n partitioned common sections, n being a natural number, and the application processor to successively access and read the data written in the partitioned common sections by the main processor.

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

What is claimed is:

1. A digital processing device, comprising:
n processors, n being a natural number and the same as or larger than 2; and
a shared memory, coupled to the n processors through separate buses, respectively, having a storage area including m common sections, m being a natural number, and generating and outputting access status information related to whether an arbitrary processor accesses at least one of the m common sections, the access status information identifying what type of access is being performed by the arbitrary processor,
wherein a common section refers to the storage area that can be individually accessed by k processors during a non-coinciding period of time, k being a natural number and $2 \leq k \leq n$,
the processors comprise a main processor and n−1 application processors, coupled to the main processor through separate control buses, respectively, each application processor performing a process according to a control signal inputted through a control bus,
a first application processor of the n−1 application processors which has received the control signal, reads data which had been written by the main processor in a first common section of the m common sections,
the shared memory comprises at least one access status information pin independently corresponding to each processor, and the access status information is outputted through the at least one access status information pin,
the access status information comprises at least one of reading status information and writing status information, and
the writing status information indicating that the first application processor is accessing the first common section to write data, and the reading status information indicating that the first application processor is accessing the first common section to read data.

2. The device of claim 1, wherein the storage area further comprises c dedicated sections, respectively, that are allotted so as to be permitted to be accessed by a predetermined processor, c being a natural number.

3. The device of claim 2, wherein the first common section of a plurality of banks is configured such that each of the n processors recognizes that the first common section is allotted to the plurality of banks consisting of the m common sections and the c dedicated sections.

4. The device of claim 1, wherein the shared memory outputs the access status information to one of the n processors that attempts to access an arbitrary common section.

5. The device of claim 4, wherein the one processor inputs an access request, including at least one of address information and a control signal, into the shared memory to access the arbitrary common section.

6. The device of claim 5, wherein the control signal comprises an address signal, directed to the arbitrary common section, and a chip select signal of the arbitrary common section.

7. The device of claim 6, wherein the address signal comprises a bank address directed to the arbitrary common section.

8. The device of claim 5, wherein the control signal comprises a mode register set (MRS) signal and a chip select signal of the arbitrary common section.

9. The device of claim 4, wherein the shared memory generates and outputs the access status information by referring to a value written in a predetermined section by another one of the n processors, in order that the another processor accesses the arbitrary common section.

10. The device of claim 4, wherein the access status information is access status information related to one common section for which access is attempted or related to all common sections.

11. The device of claim 4, wherein if it is recognized that it is impossible to access the arbitrary common section by the access status information, the one processor attempting access to the arbitrary common section transmits a request for receiving access authority to the shared memory, and if it is recognized that it is possible to access the arbitrary common section according to the request for receiving the access authority, the shared memory outputs new access status information to the one processor.

12. The device of claim 1, wherein some of data pins for writing data in the storage area of the shared memory or for reading data written in the storage area of the shared memory are temporarily allotted as the at least one access status information pin.

13. The device of claim 1, wherein the shared memory comprises
    the storage area;
    n access ports corresponding to the n processors, respectively; and
    an internal controller, generating the access status information related to whether an arbitrary processor accesses the first common section and outputs the access status information to at least one of the n processors.

14. The device of claim 2, wherein section partitioning information corresponding to a capacity or a quantity of the c dedicated sections and the m common sections, is set by any one processor and is transferred to n−1 processors.

15. A memory device, which is shared by n processors, n being a natural number and the same as or larger than 2, the memory device comprising:
    n access ports, coupled corresponding to the n processors, respectively;
    a storage area, including m common sections, m being a natural number, and partitioned to be individually accessed by k processors during a non-coinciding period of time, k being a natural number and $2 \leq k \leq n$; and
    an internal controller, generating and outputting access status information related to whether the n processors access an arbitrary common section, the access status information identifying what type of access is being performed by the n processors,
    wherein the n processors, which are coupled to the n access ports, respectively, comprise a main processor and n−1 application processors, coupled to the main processor through separate control buses, respectively, each application processor performing a process according to a control signal inputted through a control bus,
    a first application processor of the n application processors which has received the control signal, reads data which had been written by the main processor in the arbitrary common section,
    the shared memory comprises at least one access status information pin independently corresponding to each processor, and the access status information is outputted through the at least one access status information pin,
    the access status information comprises at least one of reading status information and writing status information, and
    the writing status information indicating that the first application processor is accessing the first common section to write data, and the reading status information indicating that the first application processor is accessing the first common section to read data.

16. The memory device of claim 15, wherein the storage area further comprises c dedicated sections, respectively, that are allotted so as to be permitted to be accessed by a predetermined processor, c being a natural number.

17. The memory device of claim 15, wherein the internal controller outputs the access status information to one of the n processors, which has attempted to access an arbitrary common section.

18. The memory device of claim 17, wherein the one processor inputs an access request, including at least one of address information and a control signal, for attempting to access the arbitrary common section into the shared memory.

19. The memory device of claim 17, wherein the shared memory generates and outputs the access status information by referring to a value written in a predetermined section by another one of the n processors, in order that the another processor accesses the arbitrary common section.

20. The memory device of claim 15, wherein the access status information is access status information related to one common section for which access is attempted or related to all common sections.

21. The memory device of claim 15, wherein after a request for receiving access authority to an arbitrary common section is inputted from an arbitrary processor, if it is recognized that it is possible to access the arbitrary common section, the internal controller outputs the access status information indicating that it is possible to access the arbitrary common section to the arbitrary processor.

22. The memory device of claim 15, wherein some of data pins for writing data in the storage area of the shared memory or for reading data written in the storage area of the shared memory are temporarily allotted as the at least one access status information pin.

23. The memory device of claim 16, wherein section partitioning information corresponding to a capacity or a quantity of the c dedicated sections and the m common sections, is set by any one processor and is transferred to n−1 processors.

24. A method that a shared memory, shared by a plurality of processors, provides access status information, the method comprising:
    determining whether a second processor has already been accessing an arbitrary common section if an access request to the arbitrary common section is inputted from a first processor; and
    generating the access status information corresponding to a result of the determining, and outputting the access status information to the first processor, the access status information identifying what type of access is being performed by the second processor,
    wherein the arbitrary common section refers to a storage area partitioned in order that a plurality of processors can individually access the arbitrary common section during a non-coinciding period of time, the first processor, which is coupled through a control bus to the second processor which performs a processing according to a control signal received from the second processor, reads and processes data, which had been written by the second processor, in the arbitrary common section according to the received control signal, the shared memory comprises at least one access status information pin independently corresponding to each processor, and the access status information is outputted through the at least one access status information pin, the access status information comprises at least one of reading status information and writing status information of the second processor for the arbitrary common section, and the writing status information indicating that the second processor is accessing the arbitrary common section to write data, and the reading status information indicating that the second processor is accessing the arbitrary common section to read data.

25. The method of claim 24, wherein some of data pins for writing data in the storage area of the shared memory or for reading data written in the storage area of the shared memory are temporarily allotted as the at least one access status information pin.

26. The method of claim 24, further comprising:

receiving a request for receiving access authority from the first processor that determined from the access status information that the arbitrary common section is accessed by the second processor; and outputting new access status information to the first processor if it is determined that the arbitrary common section is accessible by ending the access of the second processor.

27. The method of claim 26, wherein the access request and the request for receiving the access authority, respectively, comprise at least one of address information and a control signal to attempt to access the arbitrary common section.

28. The method of claim 26, wherein the access request and the request for receiving the access authority are performed by writing a value in a predetermined area, in order that the first processor can access the arbitrary common section.

29. A non-transitory recorded medium having recorded thereon a program including a command for providing access status information by a shared memory, the command being executable by a memory device, and the non-transitory recorded medium being readable by the memory device, the program executing a method comprising:

determining whether a second processor has already been accessing an arbitrary common section if an access request to the arbitrary common section is inputted from a first processor; and generating the access status information corresponding to a result of the determining, and outputting the access status information to the first processor, the access status information identifying what type of access is being performed by the second processor, wherein the memory device is shared by a plurality of processors, the arbitrary common section is a storage area partitioned in order that a plurality of processors can individually access the arbitrary common section during a non-coinciding period of time, the first processor, which is coupled through a control bus to the second processor and which performs a processing according to the control signal received from the first second processor, reads and processes data, which had been written by the second processor, in the arbitrary common section according to the received control signal, wherein the shared memory comprises at least one access status information pin independently corresponding to each processor, and the access status information is outputted through the at least one access status information pin, the access status information comprises at least one of reading status information and writing status information of the second processor for the arbitrary common section, and the writing status information indicating that the second processor is accessing the arbitrary common section to write data, and the reading status information indicating that the second processor is accessing the arbitrary common section to read data.

* * * * *